UNITED STATES PATENT OFFICE.

MORRIS SPAZIER, OF LOS ANGELES, CALIFORNIA.

WASHING-CRYSTAL.

1,241,044.  Specification of Letters Patent.  Patented Sept. 25, 1917.

No Drawing.   Application filed January 27, 1917.   Serial No. 144,973.

*To all whom it may concern:*

Be it known that I, MORRIS SPAZIER, a citizen of the United States, residing at Los Angeles, in the county of Los Angeles and State of California, have invented new and useful Improvements in Washing-Crystals, of which the following is a specification.

This invention relates to a composition especially adapted for use in laundry work.

An object of this invention is to provide a composition which supplies a cleansing, bleaching, and souring agent, and eliminates the separate application of each of these agents.

Another object is to combine acetic acid, concentrated ammonium hydroxid and sodium carbonate to produce a neutral, crystallized product capable of being used as a single agent for cleaning, bleaching and souring.

It is the common practice in laundry work to use sodium carbonate in addition to soap for cleansing. The laundry is then bleached, next placed in a souring agent, then rinsed in clear water and placed in a bluing solution. Various chemicals are used, and in order to effectively laundry articles without injuring the same it is necessary that the persons in charge of the work be skilled in the use of the proper amount of chemicals. With my improved crystal the cleansing, bleaching, and souring are all performed together, instead of separately, thereby reducing the amount of apparatus required.

The use of my compound decreases the equipment now used in laundries, reduces the number of steps and the skill required of the operator. The ingredients are combined in substantially the following proportions by weight: 68.40% water, 27.40% sodium carbonate, 2.55% ammonium hydroxid, 1.75% acetic acid. The ammonium hydroxid is a 66% solution and the acetic acid is 80%. The water, acetic acid, and ammonium hydroxid can, however, be most conveniently measured by volume.

The method of combining the ingredients is as follows, specific quantities being given: 150 gallons of lukewarm water of about 90 degrees is placed in a tank. 500 pounds of pure soda ash, 58%, light, is then placed in the water and agitated until a clear solution is obtained. The soda ash is preferably screened to break up lumps and to thoroughly mix it. Next, a combination of ammonium hydroxid and acetic acid is obtained. This combination is produced by placing 6¼ gallons of pure ammonium hydroxid in a vessel, preferably of earthenware. 3¾ gallons of acetic acid is then added to the ammonium hydroxid and thoroughly mixed therewith. Care should be observed in making this mixture on account of the heating action, which occurs due to the chemical reaction between the ammonium hydroxid and acetic acid. The combination of acid and hydroxid are then poured into the solution of sodium carbonate and the whole slightly stirred. The solution above described is made up in one large tank and then removed into shallow pans where it is permitted to remain for two or three days, when the whole mass will have crystallized. The above method of combining the various ingredients is performed without the assistance of artificial heat.

The pans are preferably constructed of tin to prevent detrimental chemical reaction between the solution and the material of the pans.

The ammonium hydroxid and acetic acid are in such quantities that the mixture has an excess of ammonia. The resulting mixture contains ammonia dissolved in solution and ammonium acetate.

The mixture of the sodium carbonate solution, and the acetic acid and ammonium solution produces crystals which have shown by test the following: moisture 57.28%, sodium carbonate 40.02%, free ammonia 2.22% and sodium acetate .48%. The sodium acetate serves as an agent to neutralize any odors in the laundried articles, and also has a bleaching property.

What I claim is:

1. A washing crystal, including water, sodium carbonate, sodium acetate and ammonium acetate.

2. A washing crystal including the following ingredients in substantially the proportions by weight specified: water 57.28%, sodium carbonate 40.02%, ammonium acetate 2.22% and sodium acetate .48%.

In witness that I claim the foregoing I have hereunto subscribed my name this 17th day of January, 1917.

MORRIS SPAZIER.